Aug. 16, 1966

P. D. PAGE ETAL 3,267,364

COAGULATION TIMER

Filed April 18, 1962

INVENTORS
PHYLLIS D. PAGE
BRUCE B. YOUNG

BY

Kane, Dalsimer and Kane
ATTORNEYS

Aug. 16, 1966  P. D. PAGE ETAL  3,267,364
COAGULATION TIMER
Filed April 18, 1962  7 Sheets-Sheet 3

INVENTORS
PHYLLIS D. PAGE
BRUCE B. YOUNG
BY
Kane, Dalsimer and Kane
ATTORNEYS

Aug. 16, 1966    P. D. PAGE ET AL    3,267,364
COAGULATION TIMER

Filed April 18, 1962    7 Sheets-Sheet 4

INVENTORS
PHYLLIS D. PAGE
BRUCE B. YOUNG
BY
Kane, Dalsimer and Kane
ATTORNEYS

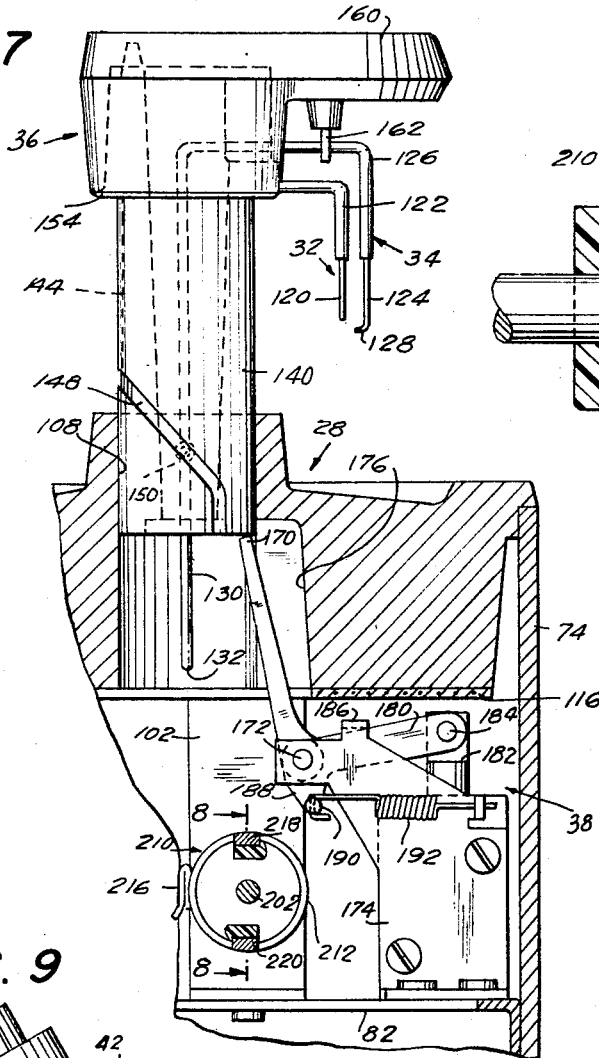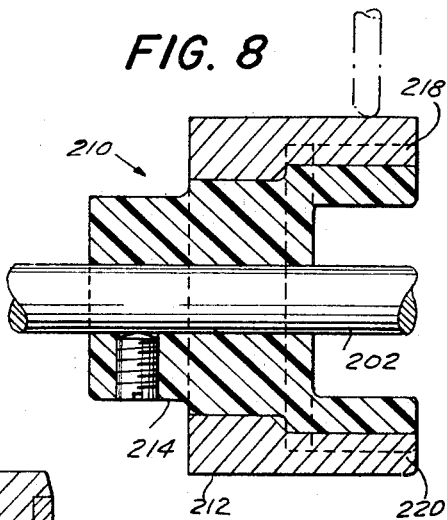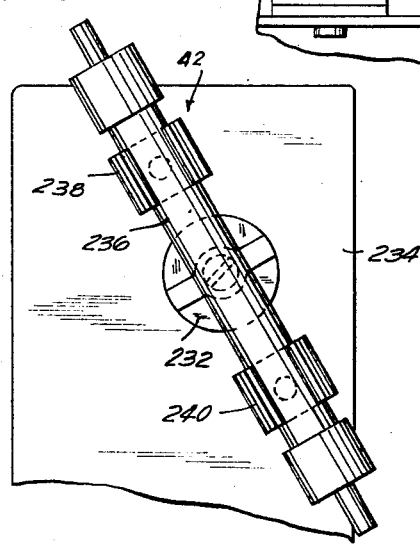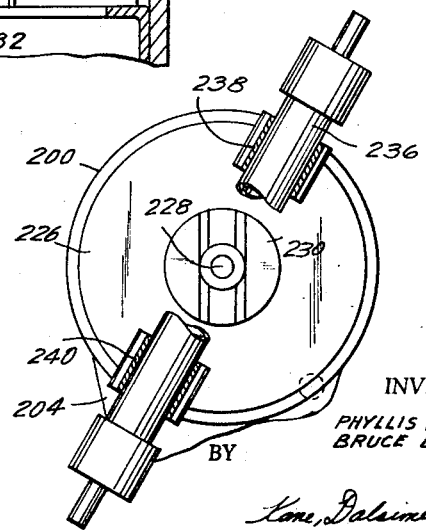

INVENTORS
PHYLLIS D. PAGE
BRUCE B. YOUNG
BY
Kane, Dalsimer and Kane
ATTORNEYS

Aug. 16, 1966

P. D. PAGE ETAL 3,267,364

COAGULATION TIMER

Filed April 18, 1962

INVENTORS
PHYLLIS D. PAGE
BRUCE B. YOUNG

BY

Kane, Dalsimer and Kane
ATTORNEYS

United States Patent Office 3,267,364
Patented August 16, 1966

3,267,364
COAGULATION TIMER
Phyllis D. Page, Aldan, and Bruce B. Young, Radnor, Pa., assignors to Becton, Dickinson and Company, Rutherford, N.J., a corporation of New Jersey
Filed Apr. 18, 1962, Ser. No. 188,934
10 Claims. (Cl. 324—30)

The present invention relates to the measurement of prothrombin time and coagulation properties of blood, and, more particularly, to improved apparatus and technique for such purposes in determining the characteristics of the hemostatic mechanism, as, for example, in anticoagulant therapy. It should be understood initially that this invention has wider applications to the field of liquid resistivity and conductivity determinations of the presence of certain bodies in liquids, and fibrillation per se. As an illustrative embodiment, this disclosure will be devoted primarily to hemostosis.

As will be appreciated, blood clotting or coagulation is the transformation of liquid blood into a semisolid, gel-like state of consistency. Clotting is essentially a function of the plasma and involves the changing of one of the plasma proteins, fibrinogen, from the sol (liquid) to the gel (solid) state. This change in consistency is brought about by the presence of tiny, threadlike, insoluble structures which form an interlacing network of fibers made of a protein called fibrin.

The clotting processes are initiated and accelerated by the juices from injured tissues. Both injured tissues and disintegrated blood platelets give off similar substances, collectively thrombokinase, which initiate the clotting reaction. Clotting thusly occurs quite automatically at the proper time in one's system. When blood escapes from an injured vessel, it is immediately exposed to the juices from damaged tissues, and its platelets disintegrate releasing thrombokinase.

An immediate factor in the clotting mechanism is thrombin, because it acts to change fibrinogen into fibrin and thusly produces a clot. Thrombin exists in the blood in an inactive form, prothrombin, which is changed by thrombokinase and calcium into thrombin at the time of clotting. Prothrombin itself does not occur as such in normal plasma, but is combined with a substance called antiprothrombin which with thrombokinase is united in order to initiate the clotting mechanism. This union releases prothrombin. This prothrombin is changed into thrombin in the presence of calcium. The thrombin, together with fibrinogen, the soluble protein present in normal plasma, produces fibrin, the insoluble protein which constitutes the actual clot.

In the clotting of blood a number of reactions occur, but for practical purposes the clotting mechanism can be divided into three major steps. The first phase of the process is the generation of intrinsic thromboplastin. A factor from the platelets and constituents of plasma participates, the latter being designated as the thromboplastinogen complex. Included in these constituents are thromboplastinogen, a factor lacking in classical hemophilia, and plasma thromboplastin, a component ordinarily deficient in hemophilia B. In the generation of thromboplastin, the catalytic action of thrombin plays an important role.

The second step in the clotting mechanism is the production of thrombin. The thromboplastin generated in the first steps interacts with prothrombin and several auxiliary agents. Prothrombin along with these agents is collectively called the prothrombin complex, the activity of which is expressed as the prothrombin activity.

The third step is the conversion of fibrinogen to fibrin by the enzymatic action of thrombin. The speed of this reaction is determined by the rate thrombin is generated.

Prothrombin time is explained as the period in which thrombin is formed by the interaction of prothrombin activity with calcium and thromboplastin. The prothrombin time in man is remarkably constant, being approximately twelve seconds. Any deviation, even of one second, is indicative either of faulty techniques or of a significant abnormality in the patient's blood or hemostatic mechanism.

Scientifically, the prothrombin time is most valuable in dividing the bleeding states due to coagulation defects into two major classes; those with normal prothrombin activity and those with decreased prothrombin activity. The first category comprises the diseases in which the prothrombin time is entirely normal, but the generation of thromboplastin is defective, the most important in these groups being hemophilia B, thrombocytopenia, thrombobasthenia and pseudohemophilia B. The second class may be designated as the hypoprothrombinemic states, which include hereditary hypoprothrombinemia vera, hereditary labile, stable factors, deficiencies and others.

The last stage of the coagulation process is the classic one of the change of fibrinogen to fibrin under the influence of thrombin. A number of anticoagulants, namely, heparin and dicumarol, as well as others, have been proposed in anticoagulant therapy. These compounds as well as those conventionally employed are controlled primarily by prothrombin time determinations.

Heretofore, in such time determinations fresh blood was initially drawn then centrifuged to separate the blood plasma. Approximately 0.1 cc. of the plasma was added to 0.2 cc. of thromboplastin and calcium chloride, and the time of clotting determined. In this connection certain authorities believed that such tests do not measure the level of activity of the prothrombin in the blood, but rather measure the total potential coagulability of the blood. Be that as it may, the clinician or for that matter the physician wants to know whether the amount of anticoagulant given to each particular patient is adequate in maintaining the total coagulability of the blood at such a level that neither spontaneous thrombosis nor hemorrhage will occur.

In accordance with a particular proposed technique for medical, as well as clinical use, standardized and stabilized chemical reagents are placed in tubes and heated to normal body temperatures taken to be 37° C., the accepted standard. Ordinarily, a reagent will include various activators for causing plasma to experience thrombosis. Such activators may include thromboplastin and calcium ions. Reagents of this type are available commercially, as, for example, Calsoplastin. This particular type of reagent is composed essentially of thromboplastin extract with calcium chloride added. The quantity of reagent is ordinarily fixed for proper prothrombin time determinations.

Control plasma, at the standard operating temperature and of predetermined quantity also in tubes, is then dispensed into one of the tubes containing reagents. Plasma, of a control nature, is utilized in order that the technique may have an index for purposes of evaluating a patient's coagulation mechanism. Such control plasma may be obtained commercially, as, for example, Diagnostic Plasma Control. A trained technician then utilizes a wire loop and inserts and withdraws it from the reaction mixture for purposes of sensing the initial clot formation. The same procedure is followed utilizing a control amount of patient's plasma. The prothrombin times are read and recorded.

The determination of the end point of prothrombin time heretofore has presented somewhat of a problem and introduces a component of error which in most techniques is human. A common method of determining the end point is to employ a nichrome wire loop immersed and then withdrawn from the reaction mixture until such time as appears a definite fibrin particle or presence of a definite solid clot. A stop watch was ordinarily employed for determining the time interval involved. Nevertheless, human error was inevitable because techniques of manipulating the wire loop differed from clinician to clinician, and the ascertainment of the end point where initiation of fibrillation was somewhat discretionary with the individual. Consequently, results of such tests would inevitably be erroneous from time to time, and anticoagulant therapy administered improperly in such cases because of mistaken prothrombin times.

It is therefore an object of the present invention to provide an apparatus for measuring the properties of liquid materials by detecting electrical resistivity characteristics.

Another object is to provide an automatic timing device for detecting the initiation of fibrillation of a liquid material capable of producing such a phenomenon.

Still another object is to provide automatic apparatus for measuring the coagulation properties of blood and for determining prothrombin times.

A further object is to provide an electro-mechanical instrument to measure coagulation properties of plasma in diagnostic and therapy control.

A still further object is to provide a coagulation timer which instrument automatically duplicates the time tested manual technique employed by trained technicians using a wire loop to arrive at more accurate end points for prothrombin time determinations.

An important object is to provide a coagulation timer adapted to be employed as a module of a modular system in a laboratory or clinic devoted to testing and measuring the coagulation properties of blood and plasma.

Another important object is to provide a miniature, readily-portable, reduced-size, light-weight automatic instrument for prothrombin time determinations.

In accordance with the present invention, an electro-mechanical instrument to measure coagulation properties of plasma in diagnostic and therapeutic control is provided having particular application to prothrombin time determinations. It should be clearly understood, however, that this invention is not necessarily limited to this field and has wider application and utility, as, for example, in measuring the resistive and conductivity properties of liquids as well as their capabilities to initiate the process of fibrillation. Briefly stated, the timer of this invention is incorporated into a casing of relatively reduced size, whereby the over-all unit is readily portable, light-weight, compact, and miniature, yet effectively operated with efficiency. A heater block is mounted by a casing and is formed with a number of wells for receiving test tubes containing either patient's or control plasma or selected chemical reagents for carrying out the coagulation process. The block additionally includes a reaction well which receives a test tube wherein the particular plasma is reacted with the selected reagent.

A binary heating system that is thermostatically controlled serves to heat the block to the desired temperature and maintain it at this point within preset limits. In prothrombin time determinations the temperature ordinarily selected is that of the normal body temperature, notably 37° C. One phase of the heating system serves to heat the block quickly and in order to eliminate overshooting is set to cut out a few degrees below the preset standard, which, if selected to be that of the standard body temperature, will cut out below 37° C. The second phase of the heating system although energized together with the initial phase then serves as the only heater and effectively maintains the temperature of the block at 37° C. within narrow limits.

A pair of electrodes are suspended from a probe carrier assembly which is adapted to assume a rest position at which the electrodes are retracted laterally to one side of the reaction well, and an immersed position. In this position the electrodes are in the specimen of liquid to be tested and measured in the reaction well. One of the electrodes is adapted to be stationary with respect to the probe arm of this assembly whereas the other electrode is movable relative thereto. In this connection the movable probe is adapted to define a certain path of travel into and out of the specimen of liquid within the reaction well to facilitate accurate sensing and detection. A probe carrier release mechanism serves to releasably lock or latch the probe arm in its rest position until such time as it is desirable to initiate the test cycle. When this stage is arrived at, the operation of the timer apparatus is initiated. However, the probe carrier arm will not be released until the expiration of a predetermined time interval in order to permit the instrument attendant or operator to remove all possible obstacles from the path of fall or descent of the probe arm and its suspended electrodes. A solenoid is included in the carrier release mechanism and, when energized, retracts a solenoid arm which has been maintaining or latching the probe arm in its rest position. Under these circumstances the probe carrier descends. Projecting surfaces of the heater block cooperate with a spiral-shaped groove or raceway in order that the probes may be directed from their rest position into the reaction well containing the specimen to be tested.

A motor having the usual output shaft is mounted within the timer casing and serves to move the movable electrode into and out of the specimen being tested, so that it is sufficiently agitated and the end point for the property being measured may be readily detected. In the case of time measurements of fibrillation initiation in a liquid specimen having such properties, the movable electrode will, in time, lift a fiber or network of fibers out of the liquid specimen. When this occurs, the desired end point of the test operation has been reached. In driving the movable electrode over the prescribed path, the output shaft of the motor mounts a stepped cam bearing a prescribed configuration. The movable probe is adapted to engage this cam and accordingly be subjected to a predetermined number of cycles into and out of the liquid specimen per revolution of the output shaft. In order to reproduce heretofore employed manual techniques for detecting the initiaton of fibrillation, particularly of blood or plasma, the movable electrode may transverse two complete cycles per revolution of the output shaft set to rotate at the rate of one revolution per second. The cam face, under these circumstances, will be twice repeating two-step cam.

A timing means for registering the end point of the measurement being taken is also incorporated in the casing. This timing means may assume the form of a digital read-out which may be pulsed synchronously with the rotation of the output shaft of the motor. Thus, one or a series of magnets may be rotatably driven by the motor. A reed type of switch includes a pair of magnetically excitable switch contacts is disposed in close proximity with the path of travel of the magnet. When this occurs, a signal is then transmitted to the digital read-out. In the disclosed embodiment the magnet closes the reed switch and thereby permits the read-out to be pulsed every tenth of a second. A suitable gear network can be employed for such purposes to attain this speed ratio. When the particular measurement being made has been completed, the timer will cease operation.

A timer bar assembly serves to initiate the operation of the apparatus. This assembly includes a solenoid as well as a solenoid arm which is in engagement with both a biased timer bar and a biased arm constituting one of a pair of switch contacts which, when closed, will set the unit in operation. When the bar is depressed, the solenoid arm will close the pair of switch contacts thereby energizing the solenoid. The solenoid, under such conditions, will maintain the solenoid arm in a depressed position notwithstanding release of the timer bar so that the switch contacts will stay closed until the end point of the measurement has been obtained. When this occurs, the solenoid will be de-energized and the arm released thereby opening the switch contacts.

A unit cutout means is also provided whereby the operation of the timer and the movement of the movable probe is stopped by de-activating the motor through the de-energization of the relay of the timer bar assembly immediately upon reaching the end point of the measurement being made. If the initiation of fibrillation is being conducted as the measurement and the liquid specimen being tested is blood or its plasma mixed with a reagent, the cutout means acts upon the sensing and lifting of fibrin from the liquid specimen or sample by the movable electrode. In this connection, an electrical potential is applied across the electrodes. In order to prevent a current path from prematurely closing as a result of the immersion of both of the electrodes in the liquid sample, the electrical potential is removed when the movable probe is immersed. This is accomplished by opening a switch in synchronization with the rotation of the motor output shaft. However, when the electrode is lifted out of the liquid specimen, the switch is closed to reapply the electrical potential. In the event fibrin of the blood sample is lifted out of the mixture by the movable probe, an electrical current path is thusly provided between the electrodes through the fibrin and blood sample. When this current path is provided, an electrical circuit is shorted whereby the solenoid of the timer bar assembly is de-energized thereby enabling the solenoid arm to resume its initial position permitting its associated switch contacts to open. Simultaneously, the motor is de-energized thereby stopping the digital read-out and movement of the movable electrode. In prothrombin time determinations, the measurement is thus made and the time registered by the digital read-out is read and recorded. Under such circumstances, it will be possible to determine the proper diagnostic and therapeutic control.

Other objects and advantages will become apparent from the following detailed description, which is to be taken in conjunction with the accompanying drawings illustrating a somewhat preferred embodiment of the invention and in which:

FIG. 7 is an enlarged fragmentary sectional view showing the probe carrier in a rest position and latched therein by the carrier release mechanism;

FIG. 8 is an enlarged sectional view of the cam for inducing movement to the movable probe;

FIG. 9 is an enlarged elevational view of the reed switch and stationary magnet;

FIG. 10 is a similar view showing the reed switch and movable magnet driven by the motor;

As stated above, the present invention is directed to the measurement of properties and characteristics of an electrical resistive medium and has particular application to the detection of the presence of a resistive body in liquids. In accordance with an exemplary embodiment, the invention contemplates the detection of the presence of fibers or similarly conformed matter in liquids, particularly the initiation of fibrillation in such liquids. With this in mind and as an illustratve application of the present invention, the detailed description and disclosure will be directed to the detection of fibers or fibrin during the coagulation or clotting process of blood. The clotting capabilities of a patient's blood including the time in which it takes such blood to clot, together with many other characteristics, are of the utmost importance in surgery and therapy. Anticoagulant therapy is an example. For purposes of diagnostic and therapeutic control, the coagulation properties and propensities of blood are ordinarily determined in terms of prothrombin time. This time is defined as the period required for a particular specimen to prothrombin to induce blood plasma clotting under standardized conditions in comparison with normal human blood. Normal prothrombin times will be in the immediate vicinity of twelve seconds, as noted previously. A discrepancy either way may indicate either faulty procedures or coagulation mechanism.

Figure 1:
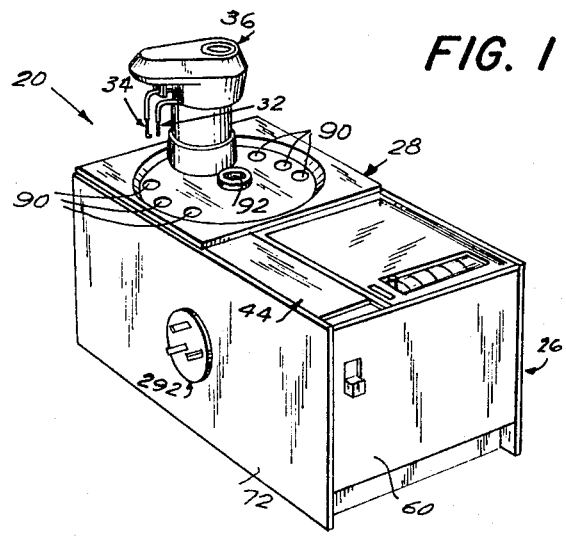
FIG. 1 is a perspective view of a coagulation timer in accordance with the present invention.
Figure 2:
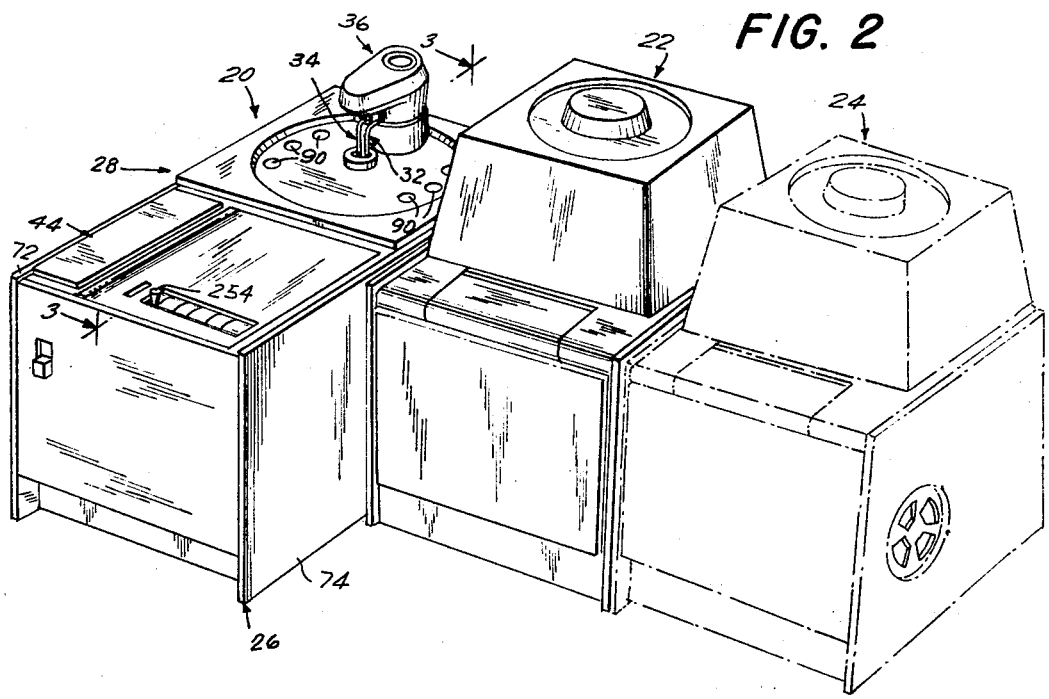
FIG. 2 is another perspective view illustrating this timer as a module of a modular system which as shown may include a miniature centrifuge which may be coupled with another centrifuge (in phantom) or timer.
Figure 3:
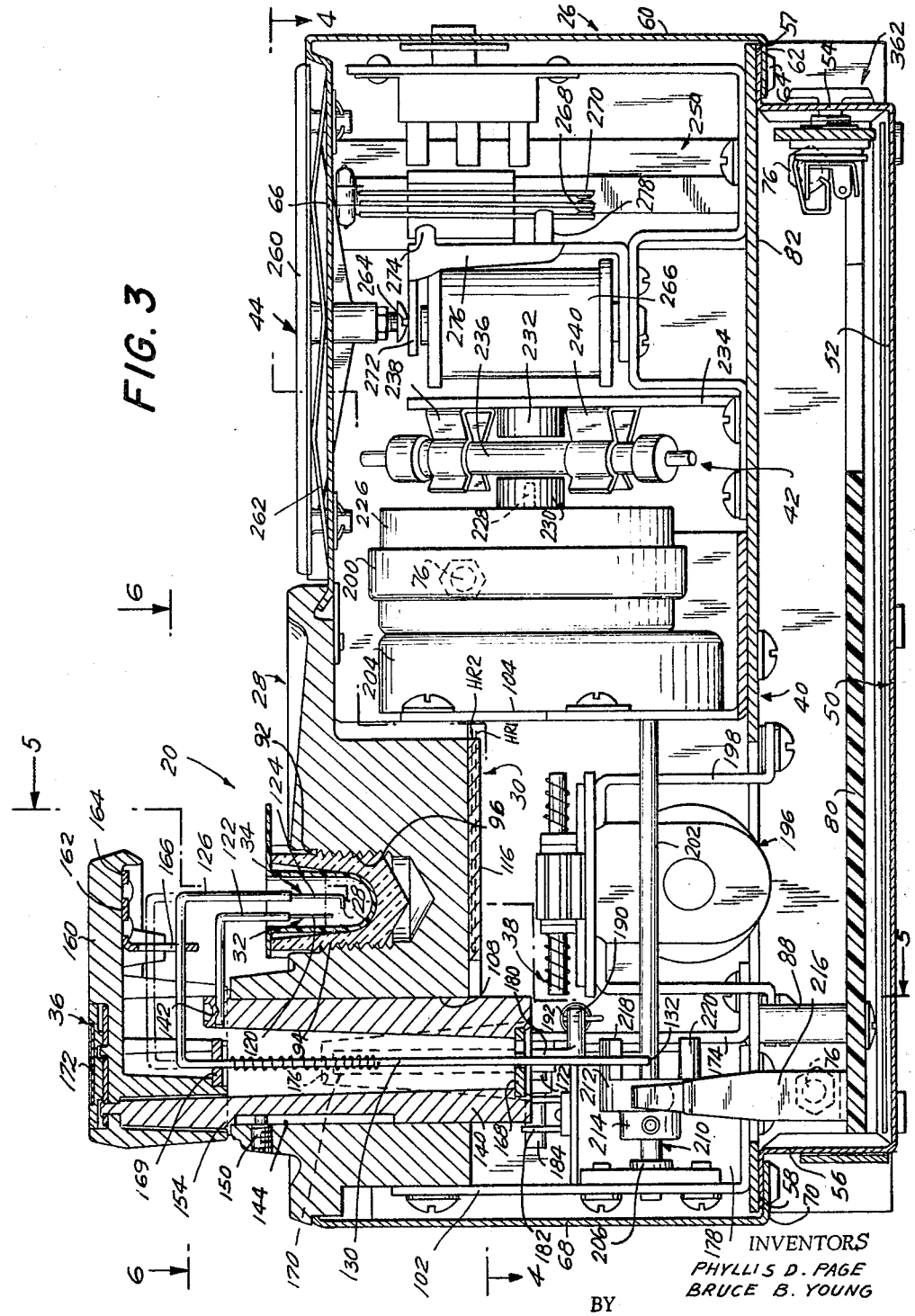
FIG. 3 is an enlarged elevational view in section taken along the line 3—3 of FIG. 2.
Figure 4:
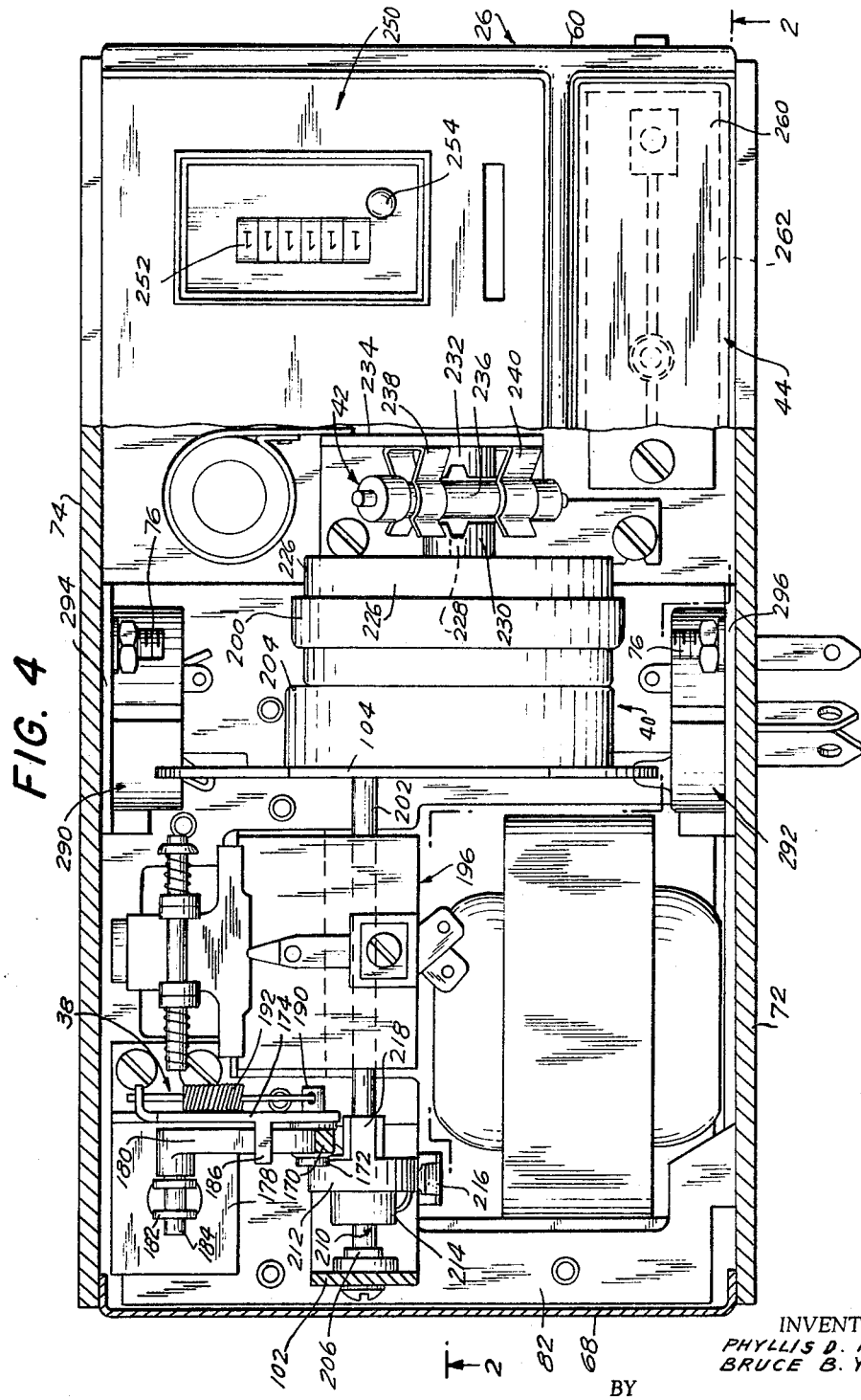
FIG. 4 is a top plan view partially in section taken along the line 4—4 of FIG. 3.
Figure 5:
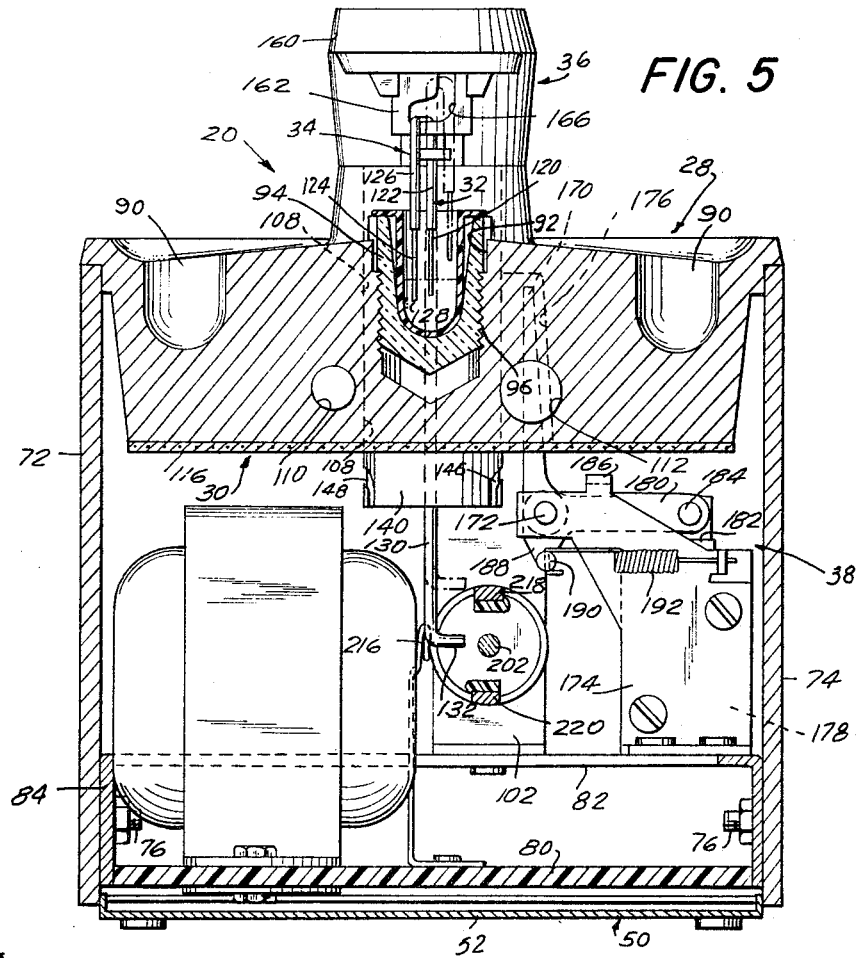
FIG. 5 is a sectional view taken along the line 5—5 of FIG. 3.
Figure 6:
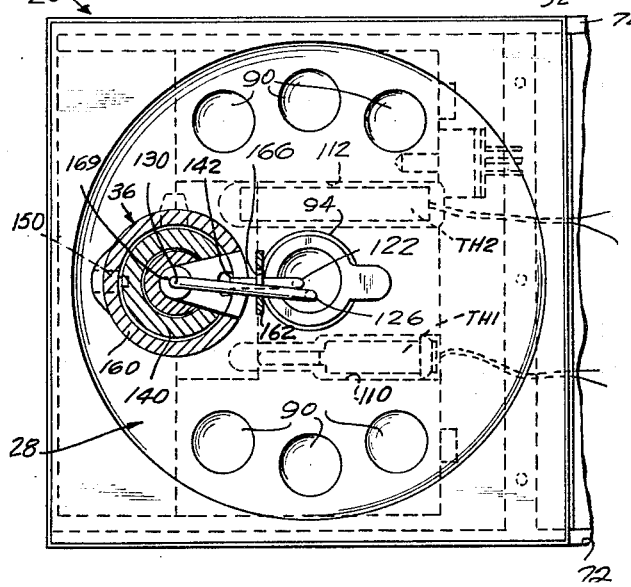
FIG. 6 is a fragmentary sectional view taken along the line 6—6 of FIG. 3.

In the drawings an electro-mechanical instrument or apparatus 20 automatically measures the coagulation properties of plasma in diagnostic and therapeutic control. This instrument is based on the afore-mentioned, time-tested manual technique adapting the basic action of a trained technician manipulating a wire loop for sensing the initial clot formation. This coagulation timer 20 is designed to form part of a modular system for investigating and measuring the coagulation properties of blood (see FIG. 2). Thus, the timer 20 may be a modular unit of a system which may include a centrifuge 22 utilized for purposes of separating the constituents of whole blood into the component parts. More specifically, the centrifuge may separate whole blood into pure plasma and isolate this constituent from the remainder. The plasma thus obtained may then be reacted with a suitable reagent to determine prothrombin times by the timer 20. As a further amplification of the modular system, another centrifuge 24, or for that matter another timer 20, may be coupled in a side-by-side relationship in accordance with the modular concept contemplated.

The timer 20 will include a casing 26 which mounts, among other units, a heating block 28 for receiving, as well as transferring, heat to the individual liquids and their reaction mixtures to be described in detail shortly. A binary thermostatically controlled heating means 30 is associated with the block 28 for purposes of raising it to the selected standard operating temperature and maintaining it at this point within very narrow limits. A pair of electrodes 32 and 34 are suspended from a probe carrier assembly 36 such that in one position the electrodes are at rest away from the reaction mixture to be tested, and in a second position at which the electrodes are operable to detect the initiation of fibrillation. As will be explained, the electrode 32 is stationary whereas electrode 34 is adapted to be movable into and out of the reaction mixture. A carrier release mechanism 38 serves to releasably lock or latch the probe carrier assembly 36 in its rest position. When this mechanism is actuated, it will release the probe carrier assembly 36 so that the probes 32 and 34 will be in an operable position immersed in the reaction mixture. A drive assembly 40 is interiorly of the casing 26 and performs a number of functions, one of which being to raise and lower the movable probe 34 out of and then into the reaction mixture. Another purpose of the drive means 40 is to actuate a timing mechanism 42 which registers and records the prothrombin times. The starting of the timing means and, for that matter, the initiation of operation of the timer 20, aside from the heating means 30, is regulated by a timer bar assembly 44. In this connection the drive means 40 will be actuated to, in turn, set into operation the timing means 42 and the movement of the movable probe 34 following the descent of the probe carrier assembly 36 after a predetermined time interval as governed by the release mechanism 38. When fibrin is sensed and detected by the movable probe, as will be explored in detail shortly, the drive means 40, and, consequently, the timer 42 and movable probe 34 will cease operation. The end point of the prothrombin time determination has accordingly been reached. This prothrombin time is then read and recorded.

Casing

Figure 11:
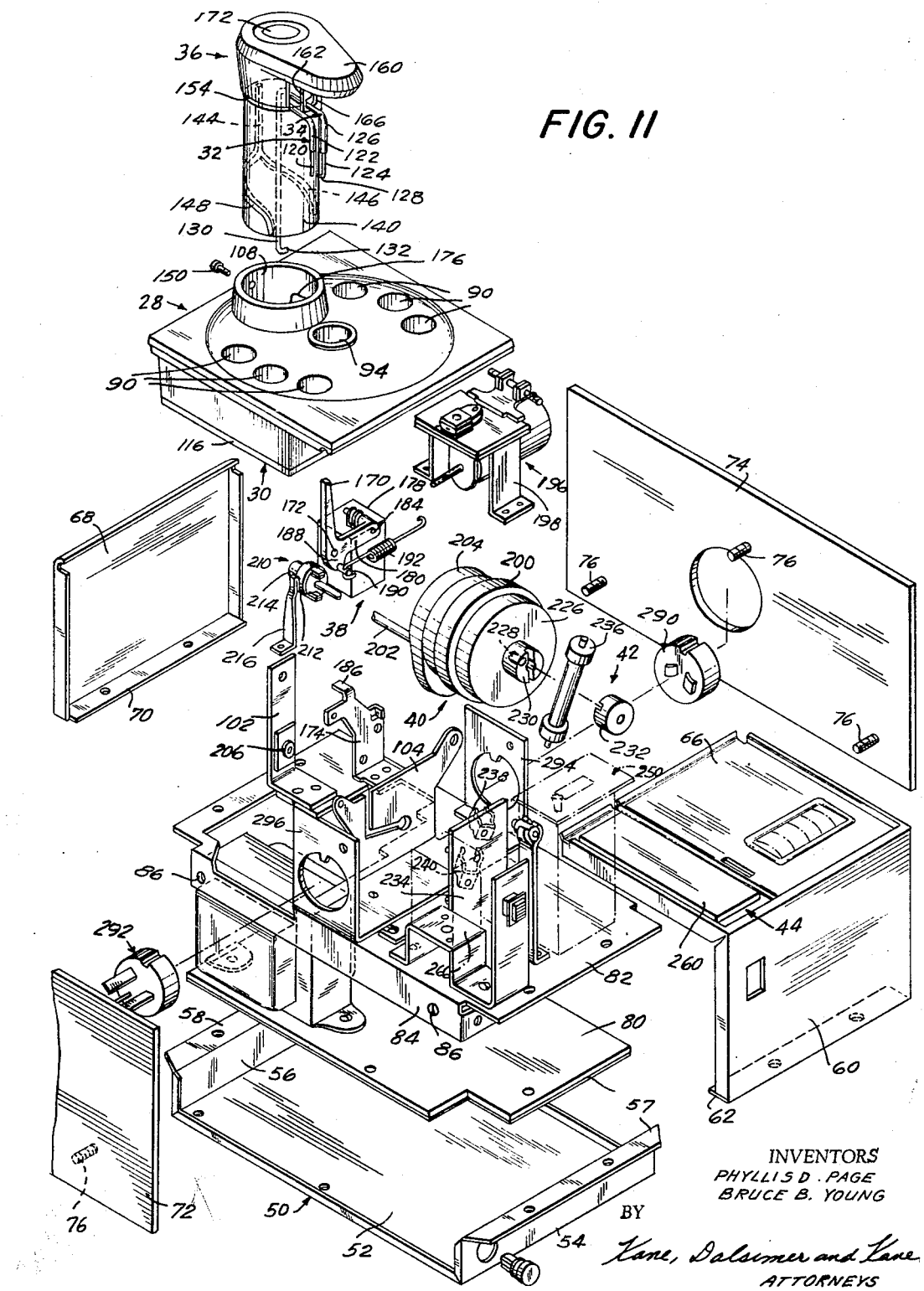
FIG. 11 is an exploded perspective view of the timer with certain parts removed for clarity.

The coagulation timer 20 is supported by a casing 26 which includes a base 50 (see FIG. 11) including an elongated plate 52 having front and rear vertically extending legs 54 and 56, respectively. These legs terminate in laterally extending flanges 57 and 58. A front cover plate 60 has a bottom flange 62 suitably connected to flange 57, as, for example, by a number of properly spaced rivets or screws 64. The front cover plate 60 additionally includes an upper inwardly extending plate 66 latched with the block 28. A rear cover plate 68 also includes a bottom inwardly extending flange 70 connected with the flanges 58 of the base similarly by rivets or screws 64. A pair of side plates 72 and 74 are anchored in place. In this regard threaded studs 76 extend inwardly from each plate and receive nuts, thereby bolting down each plate in a manner to become evident. Interiorly of the instrument, and forming part of the casing for descriptive purposes, is an insulated, printed circuit board 80 and a plate 82. Plate 82 rests on the flanges 57 and 58 of the base and is secured thereto by the screws 64. The plate 82 includes a downwardly extending apron 84 including a corresponding number of holes 86 to receive studs 76 of the side plates. The printed circuit board 80 is suspended from the plate 82 by a sufficient number of nut-and-bolt-with-spacer assemblies 88.

Heater block

The heater block 28 serves to heat ingredients to be mixed and maintain them at the selected temperatures. In this connection the block 28 is preferably of a heat conductive material, as, for example, aluminum. The block 28 (see FIG. 11) includes a series of wells 90 for receiving test tubes which would, in the case of prothrombin time determinations, contain either patient's or control plasma or the selected thromboplastin reagent. Centrally of the block is a reaction well 92. This well is provided by a tubular, cup-shaped insert 94 which may be secured in place by the interengaging threads 96. The reaction well 92, under these circumstances, is adjustable for purposes of determining the amount of immersion of the electrodes 32 and 34, as well as the degree of withdrawal of the movable electrodes 34 from the liquid. The heating block 28 is fastened relative to the vertical plates by brackets 102 and 104. The bases of these brackets are suitably coupled with the base plate 82. For purposes which will become evident shortly, the heating block 28 is formed with a vertically extending bore 108 for accommodating the probe carrier assembly 36, and lateral bores 110 and 112 for the reception of thermostats to be explained in detail shortly.

Heater system

The heater system 30 of the present invention serves to heat the heating block 28 to maintain the liquids mounted thereon at predetermined temperatures fluctuating within narrow limits and at the same time permit quick heat-up of such liquids. For such purposes a binary heating system 30 is provided which obtains short warm-up times and a stabilized temperature within a narrow range. This system (see FIG. 12) includes a first thermostat TH1 with an associated first heating element HR1 which is large enough to heat up the desired body to the right temperature within a short time. Once the operating temperature has been initially reached, the first thermostat opens and the first heating element is rendered substantially ineffective while a second "fine" heating element HR2 with an associated second thermostat TH2 takes over the job maintaining the temperature of the heating block 28 constant within the desired limits. This second heating element-thermostat combination is constructed to have a low power requirement. The power, as well as current requirement, is preferably low so that at average ambient temperatures and heating loads the "fine" thermostat cycles with approximately 50% off and 50% on time. With this in mind, the body temperature can be expected to be maintained over the expected range of ambient temperatures and heating loads.

The heaters HR1 and HR2 are mounted in suitable lamination 116 which electrically isolates the heaters from the base of the heating block 28 on which the heaters are disposed. The thermostats TH1 and TH2 are mounted in the heater block bores 110 and 112, respectively.

In the case of prothrombin time determination, the accepted standard operating temperature is that of normal body temperature, which is taken to be 37° C. With this in mind, the "fine" heater TH1 is set to operate at 37° C. and preferably at a tolerance within ±0.1° C. The other thermostat TH2 may be set to cut out the rough heater in the neighborhood of approximately 34.5° C. to eliminate any tendency of the heating system to "overshoot" the selected standard operating temperature.

Heating circuit

Figure 12:
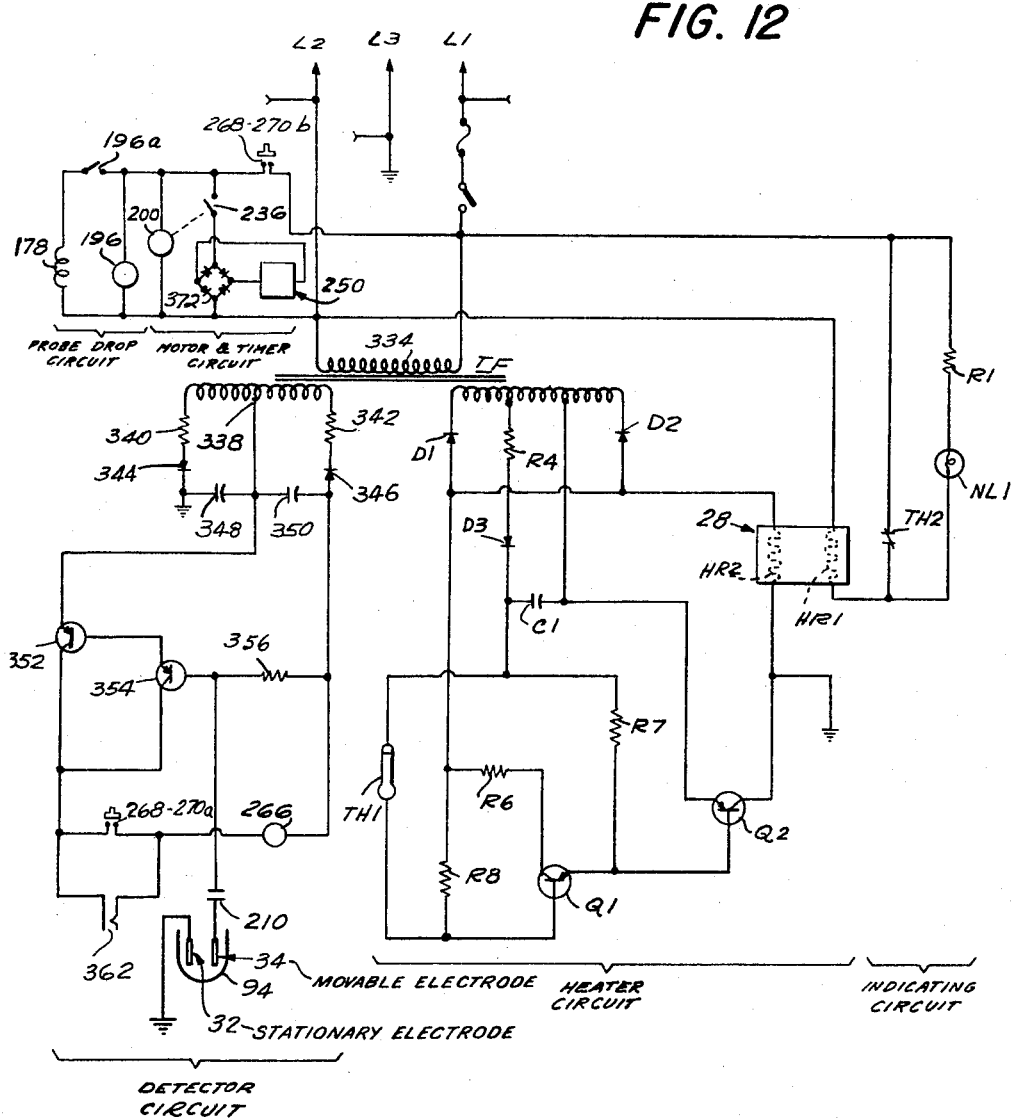
FIG. 12 is a diagrammatic view of the electrical circuitry employed.

The heating circuit forms the subject matter of a companion patent application filed in the name of Bruce B. Young entitled "Electrical Apparatus" filed on even date herewith under SN 188,484 now Patent No. 3,141,-948, granted July 21, 1964, and under which the assignee of this application has an interest, and for a complete disclosure of this circuit reference is made thereto. Suffice it to say at this time, that the heating elements and the thermostats shown in FIG. 12 are so placed with respect to their heating block 28 that they respectively directly influence and are influenced by the temperature of this block. In this figure there is shown a "warm-up" circuit comprising: the resistance element HR1, the bimetallic thermostat TH2 having a suitably large differential between its turn-off and turn-on temperatures, the neon light NL1, the resistor R1, the primary winding of the transformer TF, and the input terminals L1 and L2 of a 115 volt source. When the voltage from the voltage source is supplied to the warm-up circuit by means of the activation of an appropriate switch, current will flow through the resistance element HR1 and the closed contacts of the bimetallic thermostat TH2 which is in shunt with the series combination of the resistor R1 and the neon light NL1. Since the thermostat TH2 is effectively a short-circuit across the neon light, the latter will be off when the switch is first turned on. When the resistance element HR1 heats up the body to the desired temperature, the thermostat TH2 opens so that the current from the voltage source now flows through R1 and NL1 turning on the latter. Current also flows through element HR1, but since the resistance value of resistor R1 is relatively high and since as much as 70 volts are required to activate the neon light, the small amount of current passing through HR1 does not produce much in the way of heat. At the same time, during the warm-up period, the second circuit described below is also assisting in warming-up the body since it too is energized. After the warm-up period, the contacts of thermostat TH2 remain open, since the temperature maintenance circuit described below holds the body at a temperature higher than the temperature at which the contacts of TH2 will reclose. The neon light NL1 stays on and thereby provides a visual signal that the body has arrived at the desired temperature.

There is also a temperature maintenance circuit connected to the secondary winding of transformer TF. This includes rectifiers D1 and D2, which produce negative D.C. voltages at their terminals which are unconnected to TF, and rectifier D3 which is connected to TF through resistor R4 and produces a positive voltage. It also includes a "fine" or "vernier" thermostat TH1 which may be mercury-type, for example. One terminal of TH1 is connected to the rectifier D3 and the other terminal is connected to the base of one of the two transistors Q1 and Q2. There is also a "fine" heating element HR2 in series with the parallel combination of D1 and D2, and the collector and emitter of transistor Q2. The emitter of Q2 is also connected by a return lead to the secondary of the transformer TF and to one side of a filter capacitor C1. Current from the second winding of the transformer TF will flow through the collector-emitter circuit of Q2 whenever the potential applied to the base of the latter is negative with respect to its emitter. There is also a transistor Q1 whose emitter is connected directly to the base Q2, to the rectifier D3 and to the other side of capacitor C1. The collector of Q1 is connected via a voltage-dropping resistor R6 to rectifier D1 and via another resistor R8 to the thermostat TH1.

When the temperature of the body exceeds the predetermined temperature, the mercury rises in the thermostat TH1 thereby connecting the base of Q1 to the positive D.C. potential at the rectifier D3. Since Q1 is a P-N-P transistor, it is turned off so that its collector-emitter circuit is opened and thereby the base of Q2 is connected only to the positive D.C. potential at one terminal of D3 causing Q2 also to turn off. Since heater element HR2 is in series with the opened collector-emitter circuit of Q2, no current can then pass through it. There is, of course, a very small current flowing through the heating element HR2 due to back leakage of Q2. However, for all intents and purposes this current can be neglected.

When the temperature of the body decreases, the mercury in TH1 falls, opening its circuit and removing the positive potential previously applied to its base. Q1 thereupon is turned on again so the negative potential at one terminal of D1 can be applied through R6 and the collector-emitter circuit of Q1 to the base of Q2 which thereupon is turned on and current once again flows through the "fine" heating element HR2. Only the current flowing through R8, plus that flowing through the base of Q1 flows through TH1. This is a small fraction of the current drawn by the heater HR2 and the effective life of TH1 is very long.

*Electrodes*

The electrodes 32 and 34, during the operation of the timer 20, are supplied with an electrical potential when the movable electrode 34 is raised above the surface of the liquid in the reaction well 92. When fibrillation or, more particularly, thrombosis occurs the fibrin will be sensed and lifted out of the blood specimen by the movable probe 34. At such time, a current path is provided between the electrodes thereby determining the end point of the test. The stationary electrode 32 includes a wire tip 120 extending from a tube 122 having a 90° bend therein (see FIGS. 3, 5, 6 and 7). The other end of the tube is secured as by peening to the carrier assembly 36. The movable electrode similarly includes a wire tip 124 extending from a tube 126. The free end of the wire 124 of this electrode is bent at a predetermined space distance from the end to provide a transversely extending lifting arm 128. This arm senses and lifts the fibrin network from the blood sample in the contemplated prothrombin determinations. The tube 126 includes a double 90° bend whereby an elongated arm 130 is formed which terminates in a cam follower tip 132, the purpose of which will become apparent shortly.

Electrically, the stationary probe 32 is earthed or connected to ground whereas the movable electrode 34 is coupled directly to the conductivity detection circuitry in a manner to be described.

The stroke of the movable electrode 34 will be discussed at this time because of its relative importance. First of all, it should be established and be made clear that the space between electrodes is not critical.

The dimensional parameters of the wire 124 and projecting arm 128 are not necessarily critical, the surface area of the wire further being of no consequence. It is desired, however, that the time tested manual wire loop technique wherein a trained technician would immerse and then retract the loop from the blood specimen until such time as network of fibrin is visibly detected, be duplicated. To this end the movable probe 34 completes two cycles per second. A cycle being one complete sweep into, out of and then back again into the blood specimen.

If the extent to which the probe travels above the surface of the liquid is large, the end point of the test is extended or prolonged. If there be too small an immersion of the movable probe a good cross section of the sample being tested is not experienced. If the depth of immersion is too great fibers may be pulled off as the probe moves through the specimen. It has been found that satisfactory results are obtainable when the movable probe has an effective stroke of 0.250 inche±.008 inch read. The depth of immersion being 0.200 inch±.005 inch and the height to which the movable probe is lifted 0.050 inch±.003 inch.

If the movable probe 34 traverses a cycle too slowly the critical time and end point may be missed. Naturally, if it travels too fast the fiber and fiber network may be sheared thereby giving improper end points.

*Probe carrier assembly*

The probe carrier assembly 36 serves to properly place the electrodes 32 and 34 in the reaction well 92 when the timer is set in operation. When in non-use or prior to initiation of operation or after an end point has been reached, the probe carrier assumes a rest position at which the electrodes are directed upwardly and to the side away from the reaction well. The probe carrier assembly (see FIGS. 3, 5, 6 and 7) comprises the tubular carrier 140 which receives, interiorly thereof and in a coaxial relationship, the arm 130 of the movable probe 34. The carrier 140 is peened as at 142 for purposes of anchoring thereto the stationary electrode 32. This carrier 140 is slidably disposed in the bore 108 of the heater block 28 as previously explained. At the rear of the carrier 140 is formed a groove network which includes the longitudinally extending groove sector 144 which extends into bifurcated grooves 146 and 148. A set screw 150 extending from the heating block 28 into this groove network serves to direct the movement of the probe carrier assembly 36 from a raised position to a lowered position at which the probes are in the reaction well and vice versa. The bifurcated groove system permits the raising of the carrier assembly 36 and shifting to either side of the reaction well as desired. Notwithstanding the side to which the carrier assembly is laterally shifted, upon the release of the carrier assembly by the carrier release mechanism 38, the electrodes 32 and 34 will eventually fall into the reaction well 92. The radial flange 154 of the carrier 140 engages the heater block 28 to stop the downward descent of the carrier and probes 32 and 34.

A cap 160 fits neatly over the top of the carrier 140 and is secured thereto in any one of a number of ways, as for example, by peening studs extending upwardly from the carrier through openings in the cap as shown. A strap 162 is suspended from the cap 160 for supporting the movable probe 34 and guiding its sweep. In this connection, the strap 162 will be provided with an opening 166 of such configuration that the traverse of the tube 126 therein will be translated into a corresponding movement of the arm 128. A washer 168 on the carrier 140 and washer 169 on the cap 160 serve to guide the arm 130 through its movements.

A name plate 172 may be secured in a suitably formed recess in the cap 160 if desired.

*Electrode carrier release mechanism*

The electrode carrier release mechanism 38 serves a dual function. Firstly, while in a de-energized state, it is adapted to maintain the electrode carrier 36 in either of its two rest positions. Secondly, in an energized state, it will permit the electrode carrier 36 to descend. The interengagement of the slotted network of the carrier 140 and the set screw 150, will place the electrodes 32 and 34 in the reaction well 92. In accordance with one of the standardized techniques, as previously discussed, 0.2 ml. of reagent is contained in the tube. Then 0.1 ml. of either control or patient's plasma is inserted in the tube containing reagent. In order to enable the attendant or timer operator to remove instruments, fingers and the like from the path of travel of the electrode carrier 36 and electrodes 32 and 34, a time delay is incorporated into the carrier release mechanism 38 before the probes are permitted to descend.

The carrier release mechanism (see FIGS. 3, 4, 5, 6 and 7) includes a lever 170 pivotally mounted by pin 172 to the bracket 174 suitably anchored to the plate 82. The lever 170 is adapted to assume a release position in which it is disposed in an accommodating recess 176 in the heater block 28, as will be explained, when the solenoid 178 of this mechanism is energized. The lever is also adapted to assume a locked or latched position at which the terminal end of the lever 170 will engage and support the base of the carrier 140. The lever 170 includes a laterally extending integral arm 180. The free end of this arm is pivotally connected with the core 182 of the solenoid 178 by means of the pivot pin 184. The bracket 174 includes an inwardly extending flange 186 which serves as a stop in limiting the upward pivotal movement of the arm 180, and consequently, the lever 170 about the pivot pin 172. The lever 170 further includes an extension 188 having a transversely extending stud 190 which secures one end of the compression spring 192. The other end of the spring 192 is anchored to the bracket 174. Under these circumstances, the bias of the spring 192 will urge the lever 170 inwardly about the pivot pin 172. Due to the engagement of the upper end of the arm 180 and the inwardly extending flange 186 the upper edge of the lever 170 will come to rest direct under the bottom edge of the carrier 140. Thus, the carrier assembly 36 will be supported in its rest position. As a result of the energization of the solenoid 178, its core 182 will be retracted urging the arm 180 downwardly and, consequently, the lever 170 away from the carrier 140 against the bias of the spring 192. When this occurs the carrier assembly 36 will be free to fall or drop, placing the electrode 32 and 34 in the reaction well 92. Immediately upon de-energization of the relay 178 the spring 192 will return the lever 170 to its original carrier holding position. This will be obtained upon the manual lifting of the probe carrier assembly 36, permitting the interengagement of the top edge of the lever 170 and the bottom edge of the carrier 140.

*Motor drive*

The movement of the movable probe 34 as well as pulsing of the timing means 42 together with the application of electrical potential across the electrodes 32 and 34 only when the movable electrode 34 is raised above the surface of the blood sample, is influenced by the *d* drive mechanism 40. Included in the drive mechanism 40 (see FIGS. 3, 4, 5 and 11) is a synchronous motor 200 having output shaft 202 and interposed gear network 204. As stated, this motor is adapted to rotate the shaft 202 at a rate of one revolution per second. A suitable motor for the intended purposes may be secured from the Hanson Mfg. Co., known as the "Synchron" motor.

A bracket 104 serves as a motor mount and is suitably anchored to the base plate 82, as well as the heating block 28. The output shaft 202 extends through the upstanding leg of the bracket 104; the terminal end of the output shaft 202 is joined in the central upstanding leg of the bracket 102 by means of a suitable bearing 206. A cam member 210 is anchored to the output shaft 202 and rotatable therewith. This member includes a cam contact portion 212 and a cam insulating portion 214. A contact arm 216 extends from the printed circuit board 80 and wipes across the electrical contact portion 212 of the cam member 210. As will be appreciated, the electrical contact portion 212 has a pair of diametrically opposed longitudinally extending integral electrical contact tongues 218 and 220 which are adapted to brush against the cam follower edge 132 of the arm 130 of the movable probe 34 to complete the circuit from the contact 216 through the movable probe 34. The tongues 218 and 220 serve as stepped cams whereby the movable probe 34 will be lifted through its sweep in an ascending path upon contact with either tongue and then pass through its descending sweep into the specimen, when contact with the cam tongues 218 and 220 by the cam follower edge 132 ceases to exist.

A time delay relay 196 is supported on the plate 82 by means of bracket 198. This relay serves to provide a suitable time delay before the solenoid 178 is energized to permit the release of the electrode carrier 36. In this connection, the clinician or attendant will have ample time to remove any instruments or members of the body from the path of travel of the probe carrier assembly 36 particularly the probes 32 and 34. A suitable time delay relay may be obtained commercially as the Heinemann type A, Time Delay Relay, 2 seconds, 115 v./50–60 cycle, S.P.D.T.

The present invention further contemplates another drive take-off from the motor 200. This take-off passes through a second gear network 226 meshed with a motor 200. The output from the gear train 226 is transferred to the secondary output shaft 228 which securely mounts a permanent magnet 230 for rotation. For purposes that will become apparent shortly, the magnet travels at the rate of ten revolutions per second. This can obviously be varied depending upon the smallest increment of time desired to be measured by the timer 42. The permanent magnet 230 cooperates with the magnet 232 mounted on the bracket 234 which, in turn, is secured to the place 82. Both magnets may be obtained commercially as the Indiana Permanent Magnet, Cat. No. SU–1608, Magnetize Poles, "N" and "S". The magnets 230 and 232 are placed in substantial coaxial alignment. Thus every 360°, opposite poles will be disposed across from one another. In this connection, a reed switch is mounted such that its longitudinal axis will be in substantial alignment with the opposed poles of different polarity. The reed switch 236 is accordingly mounted by the bracket 234 to the pair of mounting clips 238 and 240. The reed switch 236 is readily available commercially and basically is a magnetically excitable switch having a pair of contacts that are adapted to close in the immediate vicinity of a magnetic field of the type which would be produced by aligned magnets 230 and 232 having opposite poles facing one another. As will be appreciated shortly, the closing of the reed switch 236 permits a digital readout counter to be pulsed thereby indicating the selected increment of time, which, in the present case, would be in tenths of a second.

The timing means further includes a resettable digital readout which may be obtained commercially as Veeder Root Counter, from Veeder Root, Inc. This counter 250 will possess the readout register 252 and reset button 254. The readout 252, as stated will indicate time in tenths of a second, because of the pulsing of the counter ten times a second per revolution of the secondary motor output shaft 228.

Timer bar assembly

This assembly 44 is employed for purposes of initiating the operation of the motor drive mechanism 40 which actuates the timer 42 and the movement of the probes 32 and 34 after the preset time interval created by the probe carrier release mechanism 38 expired at which time the probe carrier assembly 36 is lowered. To this end, a timer bar assembly 44 (see FIGS. 3, 4 and 11) includes a manually depressable plate 260 which is spring biased upwardly in the upper face of the casing 26 of the coagulation timer by means of leaf spring 262. This plate 260 includes an adjustable downwardly extending foot 264 which may be the head of an adjustable screw or bolt. A relay 266 is adapted to be energized by pressing the plate 260 downwardly in order to close two pair of switches 268 and 270. This switch closure will complete the circuit to the motor timer 42 and the time delay relay 196. At the same time, the coil of the relay 266 will be energized to attract the armature 272 to maintain the switches 268 and 270 closed. Under such circumstances, the pressure plate may now be released.

The armature 272 of the relay is in engagement with the downwardly projecting foot 264 of the plate 260 and is adapted to pivoted about the pivot point 274 due to the lowering of the foot 264. The armature at this end also includes a downwardly depending arm 276 having a lateral projection 278 which, in turn, engages the movable contacts 268. In this connection the movable contacts are shifted into closing relationship with the corresponding stationary pair of stationary contacts 270 by the lateral projection 278 as the armature 272 is lowered about its pivot point 274 by the foot 264 of the pressure plate 260. This relationship will be maintained following the energization of the relay 266 notwithstanding the release of the pressure plate 260.

When a fiber of the blood specimen being tested is detected and, consequently, the initial clot formed, a short circuit occurs resulting in the de-energization of the relay 266 and return of the armature 272 to its initial position. The movable contacts 268 possess a sufficient degree of flexibility to return the armature 272 to this position in the absence of magnetic forces created by the relay. The two pair of switches naturally will open, causing the cessation of operation of the drive motor 200 and over-all operation of the coagulation timer 20.

Detection timer and time delay circuitry

In the circuit diagram of FIG. 12, these circuits are illustrated. The conductivity detection circuit and timer circuit constitute the subject matter of companion and commonly assigned patent application filed in the name of Bruce B. Young, entitled "Electrical Apparatus for Conductivity Detection" identified under S.N. 188,485 and filing date of April 18, 1962, and for a more detailed disclosure of the subject matter, reference is made thereto.

In FIG. 12 the leads L1 and L2 extend to the selected electrical energy source and may be suitably fused with L3 being the ground wire. These leads are connected to the primary winding 334 of step down transformer TF. The secondary windings of this transformer are coupled with resistors 340 and 342. A rectifying diode 344 is connected with resistor 340 and then to the chassis ground, as shown. The resistor 342 is likewise connected with a diode 346 which, in turn, is connected between the junction of diode 344 and ground and, at the same time, with the center tap 338 of the transformer TF. Filtering capacitors 348 and 350 are interposed at each side of this connection with the center tap. The center tap of the transformer 338 is then coupled with the emitter of the transistor 352 forming part of a Darlington coupling in which transistor 354 is included. The collectors of these transistors in such coupling are tied directly to one another, as shown, whereas the base of transistor 352 is connected with the emitter of transistor 354. The base of transistor 354, on the other hand, is connected with the diode 346 through interposed resistor 356. The junction between this resistor 356 and diode 346 is connected to one side of relay 266. The other side of this relay 266 is connected to the junction of the transistor collectors through its normally opened switch 268–270a. It will be understood that the coupling of the transistors 352 and 354 with their collectors tied directly to one another permits them to perform essentially as a single transistor but with greater current gain. This higher current gain provides an adequate drive for the relay 266 while, at the same time, provides for a smaller current through the probes 32 and 34. In having a larger current flowing to this relay, it is possible to use a less sensitive and hence a less expensive relay.

A jack 362 is connected across the switch 268–270a and may be employed to connect the circuit to an externally located switch for manual or, for that matter, automatic energization. In this manner, the timer bar relay switch 268–270a may be by-passed.

The junction between resistor 356 and the base of transistor 354 is electrically connected with the movable probe 34. The circuit make-and-break action of the cam 210 may be interposed between this connection. Accordingly, the opening and closing of the switch cam 210 will be synchronized with the vertical movement of the movable probe 34. Thus, when concerned with fibrillation applications, the circuit between the movable and stationary probes 34 and 32 will be open when the movable probe 34 is lowered into the liquid or reaction mixture, but will close when the probe 34 is raised from the liquid. Under such circumstances, a circuit will be completed between the probes only at such time as an electric conducting fiber is lifted by the movable probe 34 from the liquid. It should be understood, and as stated, the stationary probe 32 is electrically connected with the chassis ground.

Referring now the motor 200 in the timer circuit of this invention, it will be observed that this circuit is connected across the leads L1 and L2 and is adapted to be opened and closed by means of the timer bar switch 268–270b. This switch, as well as switch 268–270a is adapted to be manually closed and then held in a closed position through the energization of their relay 266. As will be explained in detail shortly, when a fiber is detected by the movable probe 34, the circuit to the relay 266 is shorted, thereby resulting in its de-energization. Consequently, the switches 268–270a and b will open. The motor 200 is included in this circuit and is series connected with the timer bar switch 268–270b. Connected across the motor 200 and in series with the switch 268–270b is reed switch 236 which is adapted to close by means of the revolving magnet 230. As explained, the switch 236 will close every tenth of a second. This switch 236 is connected to one side of a diode bridge rectifier 372, both of which are connected across the motor 200. The signal rectified by the diode bridge 372 serves to actuate the drive of a digital counter 250 which will record each pulse received incident to the closing of reed switch 236. The descent of the electrodes 32 and 34 is dependent upon the operation of the solenoid 178 connected in parallel with the motor 200. The time delay relay 196 which delays the energization of the release relay 178 is similarly connected in parallel. The time delay switch 196a is in series with the release relay 178. In this regard, the relay 178 will not be energized until switch 196a closes upon the energization of relay 196 which, in turn, occurs after the selected time delay.

In operation the electrical leads L1, L2 and L3 are connected with the selected electrical energy source. It will be answered that a tube, the reaction mixture to be subjected to fibrillation, has been placed in the reaction well 92. Immediately thereafter, the timer bar 260 is depressed or shut to close the switch contacts 268–270a and b. The relay 266 is accordingly energized to maintain these switches in a closed position thereby eliminating the need to manually maintain them in a closed position. The motor 200 then will be actuated to impart rotation to its secondary output shaft and, consequently, to magnets 230 mounted thereon. Upon each traversal of the magnet and closure of the reed switch 236, an electrical pulse is generated which will be rectified by the diode bridge 372 to actuate the counter 250. The center tap 338 of the transformer secondary as well as the junction between the capacitor 350 and diode 346, will be at nominal negative D.C. voltages with the voltage at the center tap being ordinarily less than that at the capacitor and diode junction. The motor 200, as stated, through the operation of the cam 210 will raise and lower the movable probe 34 out of and into the reaction mixture at the preset rate, bearing in mind that the probes 32 and 34 are immersed in the mixture at the inception of the reaction following the short time delay. The release of the probes occurs when relay 178 is energized which does not take place until the energization of the time delay relay and closure of its contact switch 196a.

When the movable probe 34 is immersed in the liquid, the cam switch 210 is opened so that the current path between the probes through the liquid will not have an effect on the circuit. When the movable probe is elevated or raised above the liquid level, the cam switch 210 closes. However, in view of the extremely highly resistant airgap between movable probe 34 and liquid, the transistors 352 and 354 are in a conducting state. Under such circumstances, whenever the resistance measured across switch 210 and the probes 32 and 34 to ground exceeds the value of the resistance 356, the voltage at the base of transistor 354 is more negative than the voltage at the emitter of transistor 352. This is because of the voltage dividing action of resistance 356 and the resistance across the probes 32 and 34, both of which are in series between the higher negative voltage and ground. Under this condition, current flows from the transformer center tap 338 through the emitter and collector of the transistor 352 through the relay contact switch 268–270a, the relay coil 266 and back to the junction capacitor 350 and diode 346. If the resistance across the probes 32 and 34 to ground becomes lower than resistance 356, as for example, when a fiber is lifted by the movable probe 34 from the liquid, the transistors 352 and 354 switch to the non-conducting state. The relay 266 will, as a consequence, become de-energized opening its switch contacts 268–279a and b, thereby stopping the operation of the motor 200. The counter 250 and movable probe 34 will then cease operating. Accordingly, the time period in which the fibrillation process is initiated will be recorded.

The modular aspects of the present invention are most effectively attained by locating a female electrical plug 290 in the side wall 74 and male plug 292 on wall 72. Each of these plugs is secured in place by the bracket legs 294 and 296 extending upwardly from the base plate 82. These legs are also bolted to the associated side plates, as shown. The female plug quite obviously serves to connect the particular timer 20 to a source of electrical energy. The male plug, on the other hand, could be inserted into the female plug of another timer or other unit forming part of the modular system, as for example, a centrifuge 22 or a heating block.

Thus, it should be apparent that an effective electromechanical instrument is provided by this invention, to measure the properties of liquids, detect certain of their constituents and determine their facility to undergo fibrillation. An important application is in the measurement of coagulation properties of plasma in diagnostic and therapeutic control.

Assuming that the probe carrier is in a rest position and the heating system together with the plasma and reagent are at operating temperatures, aliquots of plasma are blown into the selected thromboplastin reagent in a tube in the reaction well 92. The timer bar 260 is immediately pressed to initiate the mechanical action. The probe carrier 36 automatically swings the probes 32 and 34 over the reaction well after the time delay dictated by the release mechanism 38. The movable electrode 34 alternately descends and lifts to seek and sense initial clot formation.

When the end point occurs the moving electrode 34 and the timer means 250 stop. Prothrombin time, in seconds and tenths, is registered on the digital read-out 252. The read-out reset button 254 is pressed; the electrodes cleaned by wiping with ordinary tissue, and the probe carrier 36 repositioned at rest, in readiness for subsequent tests.

In view of the foregoing, the afore-noted objects and advantages are effectively attained. Although a single preferred embodiment of the invention has been disclosed herein, it should be understood that the invention is in no sense limited thereby, but is to be determined by the scope of the appended claims.

We claim:

1. A portable compact and lightweight apparatus for measuring the time for initiation for fibrillation of blood by detecting the presence of fibrin therein comprising in combination:

a casing of reduced size;
a blood specimen receiving means on said casing for receiving a specimen of blood to be measured;
conductivity means for cooperating with fibrin to provide an electrical current path, such conductivity means comprising an electrode adapted to be stationary for contact with the specimen, another electrode adapted to be movable into and out of the specimen;
a first mechanism for moving the movable electrode into and out of the specimen;
a second mechanism for lowering both of said electrodes into said receiving means, said second mechanism including a carrier supporting both of said electrodes, said carrier projecting outwardly and inwardly of said casing and being displaceable relatively thereto from an electrode-immersed position to an electrode-elevated position, latching means for releasably holding the carrier in the electrode-elevated position, and said carrier and said casing having interengaging surfaces for cooperating and directing said electrodes into the receiving means when in the electrode-immersed position and away therefrom when in the electrode-elevated position;
timing means for registering the time to detect the presence of fibrin in said specimen;
electrical potential means for supplying an electrical potential to said conductivity means;
switch means for initiating the operation of said timing means;
time delay means for causing after a predetermined period of time following activation of said switch means, the latching means to release the carrier from the electrode-elevated position whereupon the said interengaging surfaces cooperate and direct the electrodes into the receiving means and the electrode-immersed position and the first mechanism to move the movable electrode into and out of the liquid;
and cut-off means for stopping the operation of said timing means and movement of the movable electrode upon lifting of fibrin out of said specimen by the movable electrode and passage of current through said conductivity means, specimen and lifted fibrin.

2. The invention in accordance with claim 1 wherein said apparatus includes heating means for maintaining said specimen at a predetermined temperature, said heating means being binary and comprising a first thermostatically controlled heating means for heating said specimen quickly and adapted to become inoperative at a temperature above normal body temperature, and a thermostatically controlled second heating means for heating said specimen and maintaining it with a pre-set tolerance of substantially 37° C.

3. The invention in accordance with claim 1 wherein said first mechanism includes drive means for moving the movable electrode into and out of the specimen, said drive means including a motor having an output shaft, said timing means comprising a series of magnets mounted for rotation with said output shaft, a magnetically excitable switch in proximity with the path of travel of said series of magnets whereby upon each pass of each magnet, the magnetically excitable switch is closed, a counter electrically coupled with said magnetically excitable switch and operable to register a digital amount in response to each closure of said magnetically excitable switch.

4. The invention in accordance with claim 1 wherein the receiving means comprises a heater block mounted by said casing and having a reaction well for receiving a specimen of blood to be measured, and a plurality of other wells for receiving specimens of blood and other liquids.

5. The invention in accordance with claim 4 wherein heating means including at least one heater and a thermostat is mounted by said block for heating and maintaining said specimens and liquids at a predetermined temperature.

6. The invention in accordance with claim 1 wherein the cooperating surfaces of said carrier includes a raceway and of said casing includes a projecting portion thereof within said raceway, said raceway being so constructed and arranged to permit said carrier to immerse said electrodes in said receiving means and remove said electrodes therefrom to a position upwardly and then to the side of said receiving means.

7. The invention in accordance with claim 1 wherein said time delay means includes a solenoid and a solenoid arm, said arm adapted to engage said electrode carrier and maintain it in said position upwardly and away from said receiving means, and said arm adapted to disengage said electrode carrier to permit its release so that said electrodes are lowered into said receiving means upon energization of said solenoid.

8. The invention in accordance with claim 1 wherein said first mechanism includes a drive means including a motor having an output shaft, a cam rotatably mounted on said output shaft, said cam having stepped cam faces, said movable electrode adapted to engage the stepped surfaces of said cam whereby upon rotation of said cam by said motor through the output shaft, the stepped surfaces of said cam move said movable electrode.

9. The invention in accordance with claim 1 wherein the first mechanism includes a drive means including a motor having an output shaft, a second switch means adapted to be actuated upon movement of said output shaft whereby the electrical potential across said electrodes is removed when the movable electrode is immersed in said specimen and applied when said movable electrode is raised out of said specimen through the interengagement of said second switch means and said output shaft.

10. The invention in accordance with claim 1 wherein said switch means comprises a solenoid having a solenoid arm, a timer bar having surfaces thereof in engagement with said solenoid arm, spring biasing means urging said timer bar away from said arm, flexible switch contacts adapted to be biased, said arm being maintained in engagement with the surfaces of said timer bar by the operation of the switch contacts being biased, said solenoid arm being adapted to shift away from the surfaces of said timer bar and against the biasing effect of said switch contacts to close said switch contacts upon the energization of said solenoid thereby initiating the operation of said apparatus, said apparatus adapted to cease operation upon the de-energization of said solenoid permitting said switch contacts to shift said solenoid arm and cause their opening.

References Cited by the Examiner

UNITED STATES PATENTS

| | | | |
|---|---|---|---|
| 2,770,531 | 11/1956 | Hawes et al. | 23—253 X |
| 2,931,977 | 4/1960 | Torstenson et al. | 324—65 |
| 3,002,384 | 10/1961 | MacDonald et al. | 324—70 |
| 3,020,748 | 2/1962 | Marshall et al. | 73—53 |
| 3,040,578 | 6/1962 | Smith | 235—103 X |
| 3,041,146 | 6/1962 | Kuzell | 23—253 |
| 3,077,106 | 2/1963 | Fink | 73—53 |

FOREIGN PATENTS 1,022,822  1/1958  Germany.

WALTER L. CARLSON, *Primary Examiner.*

FREDERICK M. STRADER, *Examiner.*

C. F. ROBERTS, *Assistant Examiner.*